United States Patent
Haywood

[15] 3,704,503
[45] Dec. 5, 1972

[54] PIPE ALIGNING CLAMPING DEVICE

[72] Inventor: Jesse B. Haywood, 141 Louise Drive, S.E., Concord, N.C. 28025

[22] Filed: Jan. 27, 1971

[21] Appl. No.: 110,048

[52] U.S. Cl. .....................29/200 P, 228/4, 269/131
[51] Int. Cl. ..............................................B23p 19/00
[58] Field of Search....29/200 P; 219/161; 228/4, 44; 269/43, 130–132; 285/21, 411

[56] References Cited

UNITED STATES PATENTS

| | | | |
|---|---|---|---|
| 1,992,322 | 2/1935 | Nulf et al. | 269/130 X |
| 3,480,270 | 11/1969 | Gill | 269/131 |
| 3,593,402 | 7/1971 | Mori | 269/131 X |

Primary Examiner—Theron E. Condon
Assistant Examiner—Neil Abrams
Attorney—Clarence A. O'Brien and Harvey B. Jacobson

[57] ABSTRACT

A device for lining up and temporarily maintaining abutting ends of pipe sections in alignment preparatory to welding and permanently joining said sections. It comprises a plurality of companion clamps positioned and circumferentially spaced around a selected one of said pipe sections. Several chains, one short and two long, are operatively coordinated with and serve to link the several clamps together. Manually regulatable slack take-up and chain tautening means connects end portions of two of the encircling chains in a manner to draw the chains around the selected pipe section. Corresponding ends of the respective clamps project and provide circumferentially spaced jaw-like piloting guides which center and align the pipe sections. Setscrews or equivalent means on the projecting ends serve in a manner to retain the aligned ends for precision welding. This device saves time and material, dispenses with other tools, and takes the place of a helper.

7 Claims, 4 Drawing Figures

PATENTED DEC 5 1972

Trestle

Jesse B. Haywood
INVENTOR.

BY *Clarence A. O'Brien*
*and Harvey B. Jacobson*
Attorneys

Jesse B. Haywood

PIPE ALIGNING CLAMPING DEVICE

This invention relates to portable devices, tools and implements which are expressly designed and adapted to enable a user to center, line up and abut the coacting ends of companion pipe sections preparatory to welding and uniting said sections and has to do with a structurally unique device which will effectually handle the task at hand and will well serve the purposes for which it has been devised.

It is a matter of common knowledge that persons working in the field of endeavor above set forth have devised many and varied devices to center and align pipe-ends as a step preparatory to welding and permanently uniting the same. For background purposes and as indicative of the state of the art to which the present invention relates, attention is directed to the flange clamp for welding disclosed in U.S. Pat. 1,940,910 issued to Daniel W. Hickey. This patent is cited here because of the fact that it shows the use of chain means encircling a pipe section. Although quite unlike the invention herein disclosed the pipe aligning tool covered in U.S. Pat. No. 2,872,888 and issued to George W. Kearney could perhaps be regarded as exemplary art.

The device herein revealed is thought to be an advance in the art in that it is light in weight and can be easily handled and transported from place to place. It is appropriate because the construction is such that it can be appropriately fitted on like or similar pipe sections ranging from small to large. Then too, it permits aligning and centering even if one pipe is larger than the companion pipe. It is simple and easy to handle, is adjustable, is economical, saves time and material and obviates the need for other tools and implements. Then too, it is such in adaptability that is capable of being used in close places difficult of access and even high places and because the component parts are made of durable steel, it will serve its purposes for years, is capable of use by a single user, and takes the place of a helper or fitter.

Briefly and when properly used the disclosed device facilitates lining up and temporarily maintaining oriented ends of two pipe sections in alignment as a step preparatory to welding and permanently joining said sections. It is characterized by a plurality of companion clamps which are adapted to be conjointly positioned at circumferentially spaced points around the exterior surface of one of the pipe sections only. A plurality of individual chains are operatively coordinated with and link the clamps together. Manually regulatable slack take-up and chain tautening means is provided for adjustably connecting the free end portions of two of the several chains whereby all of the chains are caused to snugly encircle said one pipe section. The clamps have corresponding ends which are capable of extending and projecting beyond the terminal end of the one pipe and they provide circumferentially spaced jaw-like piloting guides through the medium of which a terminal end portion of the other pipe section can be located, brought into position, centered and axially aligned with the first named pipe section. In addition, means is carried by the respective guides for securely fastening a coacting terminal end portion of the second mentioned pipe section in a manner to retain it in a given position prior to final welding.

More specifically stated it will be noted that the several clamps are characterized by a bottom clamp and a pair of left-hand and right-hand side clamps which when in use are situated on diametrically opposite sides of the coacting pipe section. Each clamp embodies an elongated rigid plate having an inward flat surface provided with a pair of correspondingly elongated spaced parallel rounds or rods which are located and fixed in a common plane and are adapted to straddle and rest directly on a coacting convex surface of said one pipe section.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
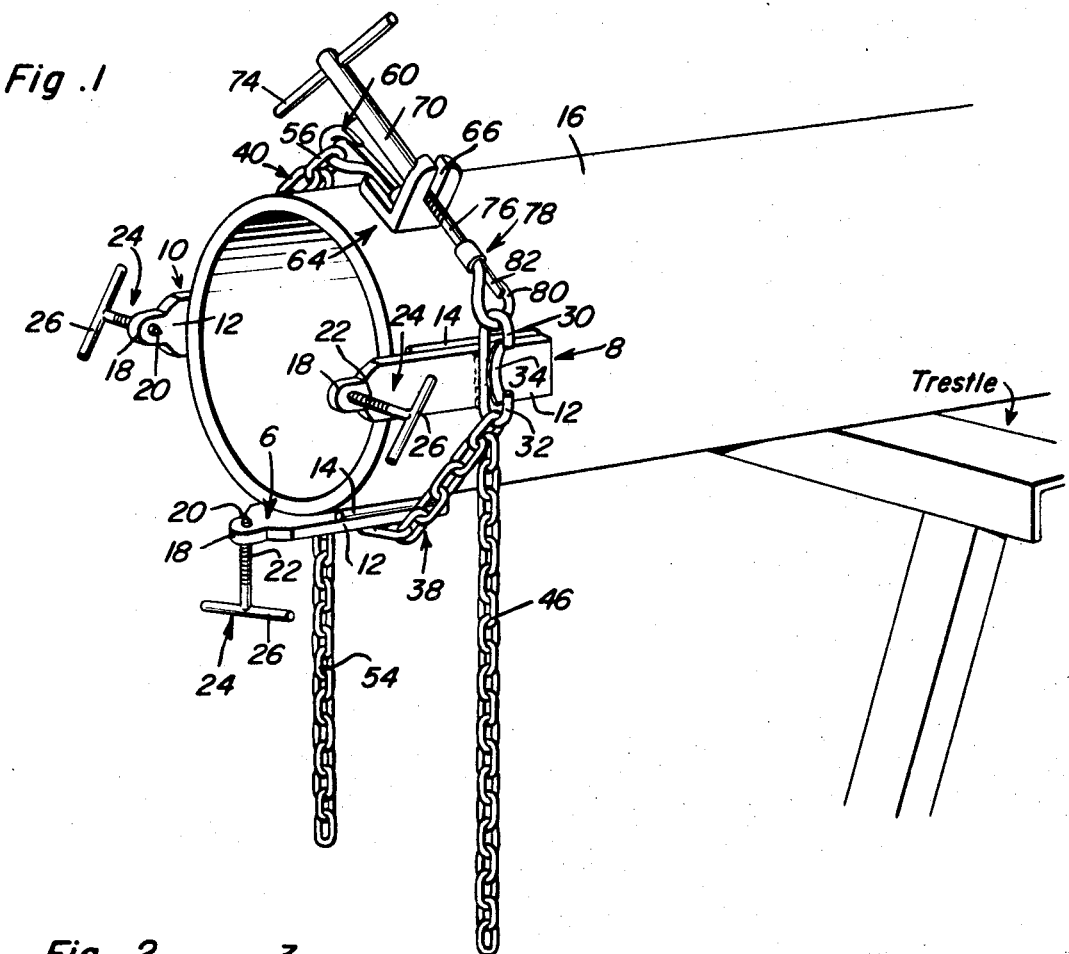
FIG. 1 is a view in perspective showing a fragmentary portion of one pipe section and showing it supported on a trestle or the like and showing, what is more significant, the device hereinunder consideration and applied and readied for use.
Figure 2:
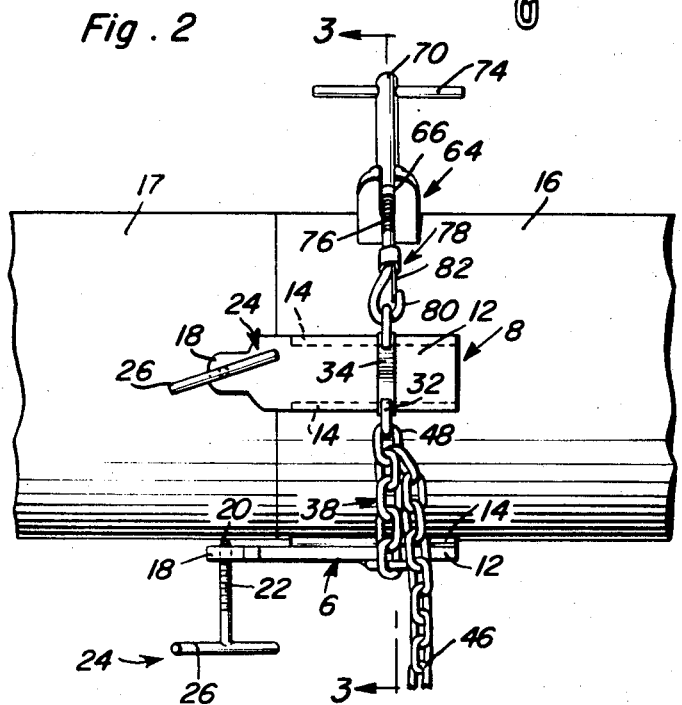
FIG. 2 is a view in side elevation showing the second length or section of pipe with the ends of the sections abutting and with the setscrew on the projecting jaws tightened to center and line up the pipe-ends for welding.
Figure 3:
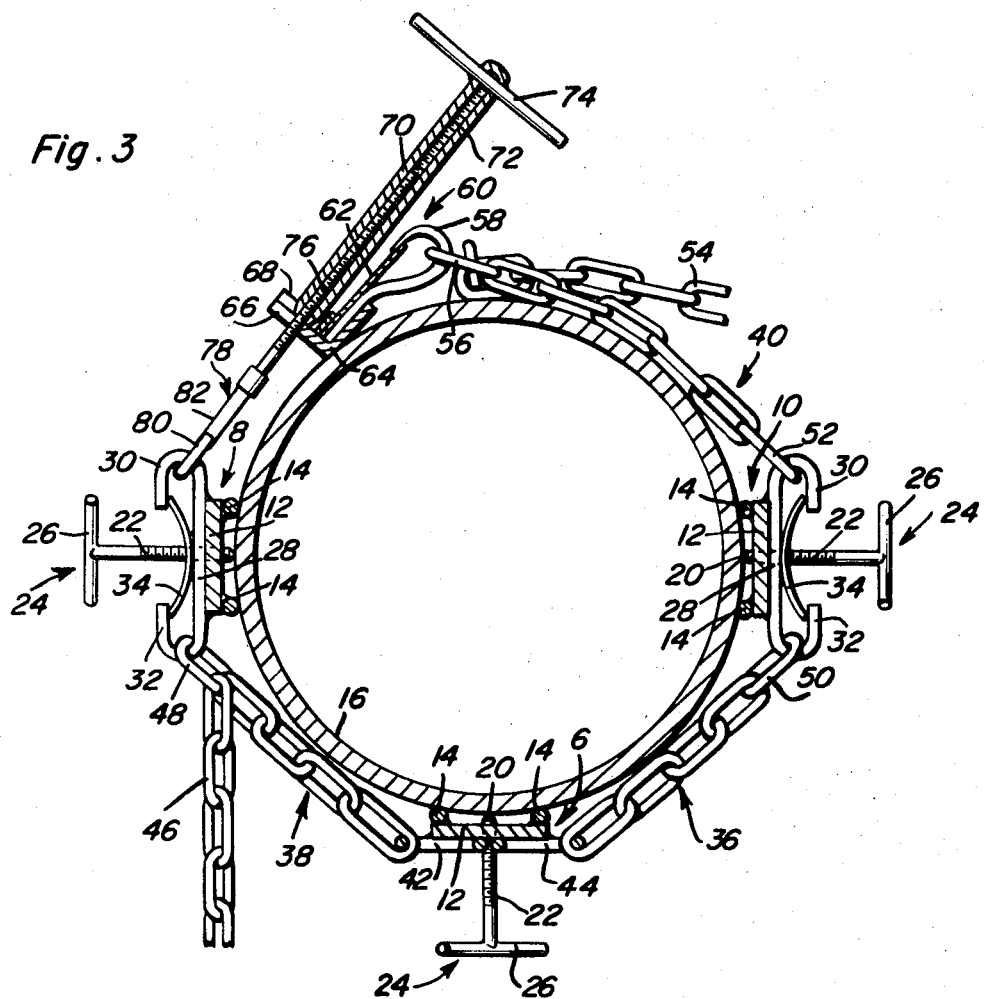
FIG. 3 is a section taken on the line 3—3 of FIG. 2 and on an enlarged scale with parts in section and elevation and wherein all of the component parts are illustrated.

Referring now to the views of the drawings and particularly to FIG. 3 it will be noted that one clamp, referred to as the bottom clamp, is denoted by the numeral 6. The complemental left-hand side clamp (FIG. 3) is denoted at 8 and the substantially diametrically opposite right-hand side clamp is denoted at 10. Basically these several clamps are much alike in that each clamp embodies a flat faced substantially rectangular rigid plate 12 whose inward flat surface is provided with a pair of like spaced parallel rounds or rods 14. These rods are commensurate in length with the length of the plates (as brought out in FIGS. 1 and 2 in particular) and the rods straddle and contact the convex surface portions of the pipe, one section being denoted (FIG. 2) at 16 and the other section at 17. The clamps are also alike in that each plate has a reduced or end portion 18 which constitutes a jaw-like extension and which projects beyond the terminal end of the pipe section 16. This extension is provided with a screw threaded hole to accommodate the pointed end 20 of the threaded shank 22 of a T-shaped setscrew 24. The cross head of the setscrew is denoted at 26. The extensions 18 provide piloting members and assist, as is obvious from FIGS. 1 and 2, in lining up the connectable ends of the first and second pipe sections 16 and 17 (see FIG. 2). The two side clamps are the same in construction and, in this connection it will be noted that the outer flat surface of the plate in each instance is provided with a substantially C-shaped adapter bracket 28. The end portions of the bracket provide turned in coordinating keeper hooks 30 and 32. A curved leaf spring 34 is provided and is fixed in place and the free end portions are releasably cooperable with the bill portions of the hooks 30 and 32 for obvious purposes.

It will be noted that the bottom clamp 6 is not provided with the clip-equipped adapter bracket means.

Figure 4:
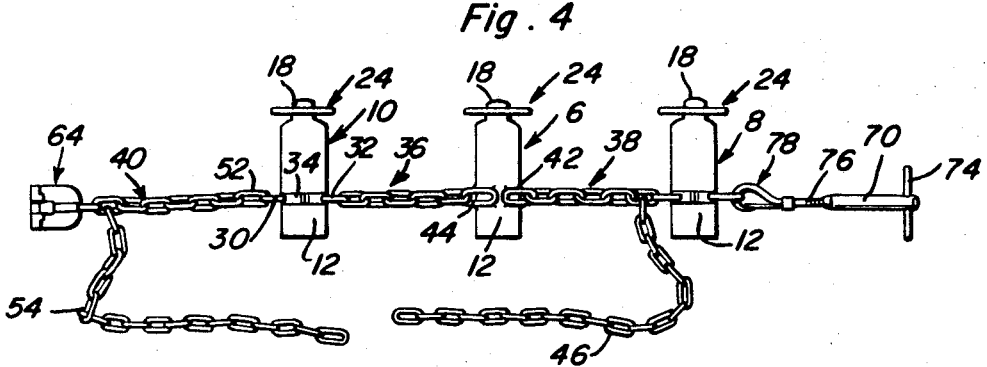
FIG. 4 is a plan view on a small scale showing the device removed with the chains spread out and the clamps diagrammatically illustrated.

There are several chains employed to encircle the surface of the pipe and the median chain of the group is a relatively short link-type chain and is denoted at 36. The left-hand chain, which is longer than the chain 36, is denoted at 38. The right-hand chain is denoted at 40 (FIG. 3). The two chains 38 and 40 are the same in construction and are of any suitable length and made up of links. One end link 42 of the chain 38 is superimposed and fixed upon the plate 12 of the bottom clamp 6 as brought out in FIGS. 3 and 4. Then too, one link 44 of the short chain 36 is also superimposed on the plate 12 and is fixed thereto. Thus, the bottom clamp 6 has two chains one chain 38 at the right (FIG. 4) and the short chain 36 at the left. It will also be noted that a free end portion of the chain 38 is denoted at 46 and that a selected link of this chain, for instance the link 48, is separably connectable with the clip-equipped keeper hook 32. A similar result in action is seen at the right in FIG. 3 wherein it will be evident that one end link 50 of the short chain 36 is connectable with the keeper hook 32 and that a similar link 52 of the chain 40 is connectable with the adjacent keeper hook 30. The free end portion of the chain 40 is denoted at 54 and it will be seen that one of the links 56 of this chain is connectable with the hook 58 of a snap fastener 60, the spring of the snap fastener being denoted at 62. This snap fastener 60 is fixedly mounted on one leg of an L-shaped cleat 64. The other leg of this cleat is provided with a notch 66 and end portions of the arms of the notch are provided with detents 68. This snap fastener 60 and L-shaped cleat 64 constitute component parts of the slack take-up device or means which functions to connect the two chains 38 and 40 together so that they will encircle and wrap around the pipe 16. The means further includes a suitably elongated sleeve 70 having a screw threaded bore 72 (FIG. 3). The upper end of the sleeve is provided with a fixed handle 74. The screw threaded bore serves to accommodate the screw threaded shank 76 of a jack screw whose lower end is provided with a snap fastener 78 similar to the aforementioned snap fastener 60. The snap fastener 78 is provided with a hook 80 which is releasably connected with the adjacent keeper hook 30 on the clamp 8 as brought out in FIG. 3. The leaf spring of this particular snap fastener 78 is denoted at 82. Thus, by connecting one snap fastener 60 with the link 56 through the medium of the L-shaped cleat 64 and connecting the other snap fastener 78 to the keeper hook 30 on the clamp 8 and then tightening the screw means 76, an end of the sleeve 70 abuts the cleat and the two snap fasteners are either drawn together or pushed apart, depending on whether the chains are to be tautened or loosened.

Once the several clamps 6, 8 and 10 are properly located (as brought out in FIG. 3) and the several chains 36, 38 and 40 are positioned, the snap fasteners 60 and 78 can be connected and the chain encircling and tightening result desired can be attained. Then too, once the several clamps and chain means is installed the projecting jaw-like extensions 18 serve to permit the second pipe section 17 to be seated and lined up as brought out in FIG. 2, after which the setscrews 24 can be tightened to keep the sections 16 and 17 centered and aligned for convenient permanent welding.

As before mentioned this device is such in construction and performance that one man either on the ground or at a level above the ground can use it satisfactorily. In fact it is comparatively light in weight and weighs only 5 or 6 pounds. It is reiterated too that it takes the place of a helper, and as experience has shown, it can actually be applied to elbows (not shown) by one man.

It is believed that the construction of the several clamps 6, 8 and 10 will be clear, that the construction and coordination of the chains 36, 38 and 40 is evident by examining the views of the drawings singly and collectively. Then too, the slack take-up and tightening and retaining means is thought to be evident from FIGS. 1–3. Under the circumstances a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for lining up and temporarily maintaining oriented ends of two pipe sections in alignment preparatory to welding and permanently joining said sections comprising a plurality of companion clamps adapted to be conjointly positioned at circumferentially spaced points around the exterior surface of one of said pipe sections, a plurality of individual chains operatively coordinated with and linking said clamps together, manually regulatable slack take-up and chain tautening means for adjustably connecting free end portions of two of said chains whereby all of the chains are caused to snugly encircle said one pipe section, said clamps having corresponding ends which are capable of extending and projecting beyond a terminal end of said one pipe section and which provide circumferentially spaced jaw-like piloting guides through the medium of which a terminal end portion of the other pipe section can be centered and axially aligned with said one pipe section, and means carried by said guides for securely fastening a coacting terminal end portion of said other pipe section in a manner to retain it in a given position prior to final welding, said clamps comprising a bottom clamp, and a pair of side clamps which when in use are situated on diametrically opposite sides of said one pipe section, each clamp embodying an elongated rigid plate having an inward flat surface provided with a pair of elongated spaced parallel rods in a common plane and adapted to rest directly on a coacting convex surface of said one pipe section.

2. The device defined in and according to claim 1, and wherein the outward surface of the plate of each side clamp is provided with a fixed adapter bracket having turned-in anchoring links on which certain hooks of adjacent chains are detachably fastened.

3. The device defined in and according to claim 2, and wherein each adapter bracket is provided with a fixedly attached longitudinally bowed leaf spring having free ends which are lined up with and releasably cooperable with the bill portions of the respectively coordinating anchoring hooks.

4. The device defined in and according to claim 1, and wherein each guide is provided with a screw-threaded hole, the fastening means comprising a T-shaped setscrew having a threaded shank which is screwed into and through the coacting screw-threaded hole in a manner to mount the shank in a position at right angles to the plane of said guide for end thrust engagement with a surface of said other pipe section.

5. A device for lining up and temporarily maintaining oriented ends of two pipe sections in alignment preparatory to welding and permanently joining said sections comprising a plurality of companion clamps adapted to be conjointly positioned at circumferentially spaced points around the exterior surface of one of said pipe sections, a plurality of individual chains operatively coordinated with and linking said clamps together, manually regulatable slack take-up and chain tautening means for adjustably connecting free end portions of two of said chains whereby all of the chains are caused to snugly encircle said one pipe section, said clamps having corresponding ends which are capable of extending and projecting beyond a terminal end of said one pipe section and which provide circumferentially spaced jaw-like piloting guides through the medium of which a terminal end portion of the other pipe section can be centered and axially aligned with said one pipe section, and means carried by said guides for securely fastening a coacting terminal end portion of said other pipe section in a manner to retain it in a given position prior to final welding, said slack take-up and chain tautening means comprising, in combination, an L-shaped cleat having one leg provided with a snap-fastener-hook which can be releasably connected with a selected chain link, the other leg having a keeper notch, a sleeve having an internally threaded bore, said sleeve having one end provided with a fixed cross-head providing a handle, the other end having end thrust engagement with said notched leg, and a jack-screw having one end screwed into the threaded bore of said sleeve, the other end being provided with an integral accessibly usable snap-fastener-hook similar to said first named snap-fastener-hook and adapted to be releasably connected with an adjacent encircling chain.

6. A device for lining up and temporarily maintaining oriented ends of two pipe sections in alignment preparatory to welding and permanently joining said sections comprising several individual clamps, namely, a bottom clamp, and a pair of side clamps, said side clamps being adapted when in use to be situated on substantially diametrically opposite sides of the pipe section with which they are cooperable, each clamp embodying an elongated substantially rectangular plate having a flat inward surface which is provided with a pair of fixed elongated spaced parallel rods located in a common plane and adapted to rest directly on a coacting convex surface of said one pipe section, each plate having a reduced end portion constituting a jaw-like extension and said extension being provided with a screw threaded hole, a setscrew having a shank threaded through said hole in such a manner that one end of the setscrew is adapted to clampingly engage the surface of a pipe section which is adapted to be lined up with said first named section, a first relatively short chain having ends connected with adjacent clamps, a second chain longer than said first chain and having one end connectable with said bottom clamp and links thereof connectable with one of the side clamps, and a complemental third chain of a length similar to the second chain and having one end connectable to a coacting side clamp and the other end free, and slack take-up means embodying two adjustably connected snap fasteners, one of said snap fasteners being operatively connected to the free end of said third chain, and the other snap fastener being operatively connected to a coacting end portion of the second chain.

7. The device defined in and according to claim 6, wherein said slack take-up and chain tautening means comprises, in combination, an L-shaped cleat having one leg provided with said one snap fastener and which can be releasably connected with a selected link of said third chain, the other leg having a keeper notch, a sleeve having an internally screw threaded bore, said sleeve having one end provided with a fixed cross head providing a handle, the other end of said sleeve having end thrust engagement with the notched leg, and a jack screw screwed into the threaded bore of said sleeve, said jack screw having said other snap fastener provided on an end thereof.

* * * * *